June 23, 1925.

B. M. DAVIS 1,543,062

SPEED CONTROLLING AND INDICATING DEVICE

Filed Sept. 7, 1920　　6 Sheets-Sheet 1

Witness:
Chas. R. Koursh

Inventor,
Bethuel M. Davis,
By: Bulkley & Swenarton, Attys.

June 23, 1925.

B. M. DAVIS

SPEED CONTROLLING AND INDICATING DEVICE

Filed Sept. 7, 1920    6 Sheets-Sheet 3

Inventor
Bethuel M. Davis.
By Bulkley & Swenarton, Attys.

Witness:
Chas. R. Koursh.

June 23, 1925.

B. M. DAVIS

1,543,062

SPEED CONTROLLING AND INDICATING DEVICE

Filed Sept. 7, 1920    6 Sheets-Sheet 5

Patented June 23, 1925.

1,543,062

UNITED STATES PATENT OFFICE.

BETHUEL M. DAVIS, OF CHICAGO, ILLINOIS.

SPEED CONTROLLING AND INDICATING DEVICE.

Application filed September 7, 1920. Serial No. 408,453.

*To all whom it may concern:*

Be it known that I, BETHUEL M. DAVIS, a citizen of the United States of America, and resident of Chicago, Cook County, Illinois, have invented a certain new and useful Improvement in Speed Controlling and Indicating Devices, of which the following is a specification.

My invention relates to a device for controlling and indicating speed and is particularly adapted for use in connection with motor vehicles.

The objects of my invention are to provide an instrument by which the speed of the vehicle can be controlled within certain limits—that is, mechanism is provided for automatically shutting off the motor when the vehicle reaches a predetermined speed.

Further features and objects of my invention consist in improved means for adjusting the device whereby the propelling motor can be rendered inoperative at varying speeds and also in means for locking the adjustment so that one operating the car is unable to change the set speed to which the instrument has been adjusted.

These and other features and objects of my invention will be more readily understood by having reference to the accompanying drawings in which I have illustrated my invention in connection with a speedometer so that the speed is not only controlled but is also indicated by the speed dial.

Figure 1:
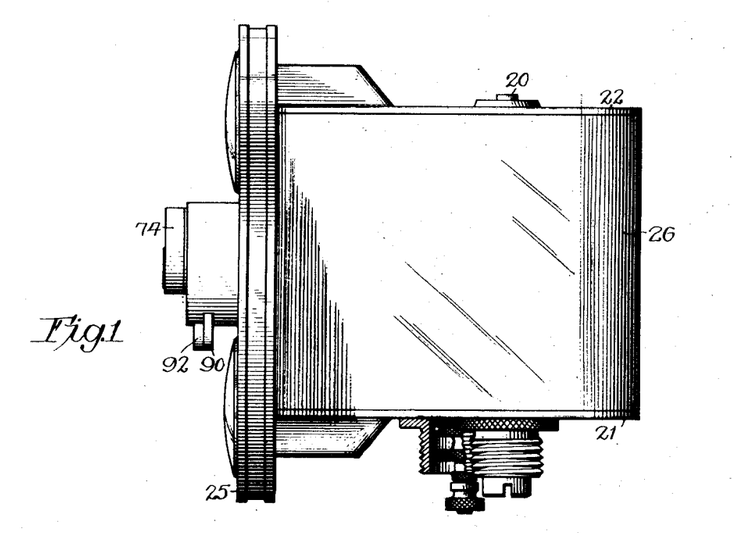
Figure 1 is a side elevation of an instrument embodying the features of my invention.
Figure 2:
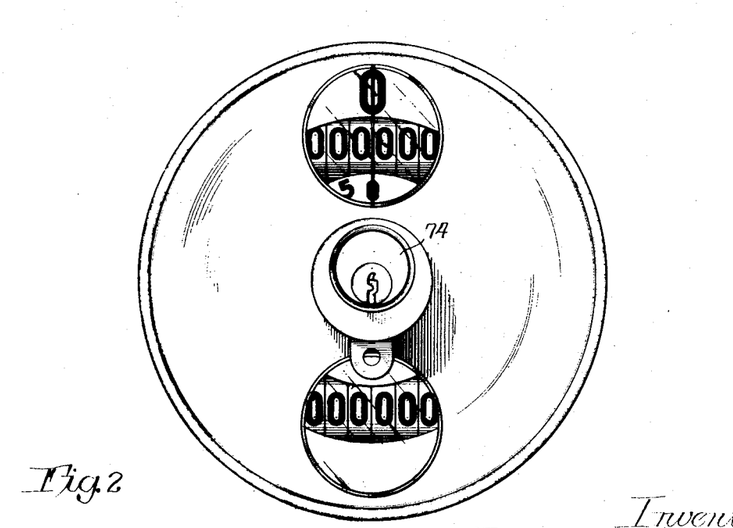
Fig. 2 is a front elevation of the same.
Figure 3:
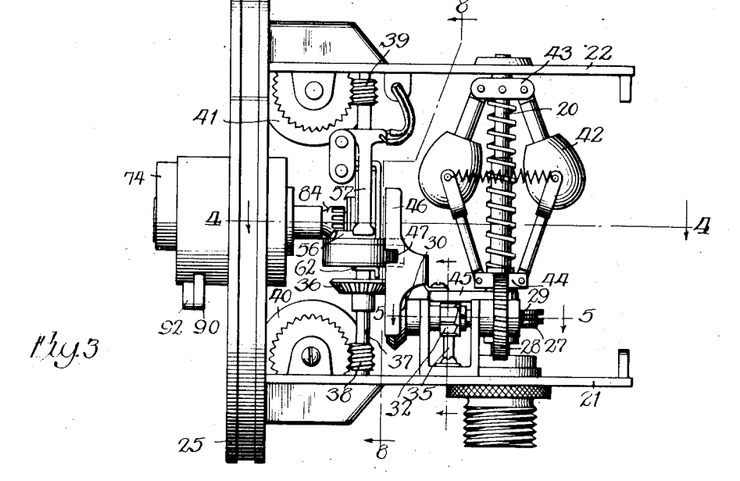
Fig. 3 is a side elevation with the enclosing casing removed so as to show the interior construction.
Figures 4, 5:
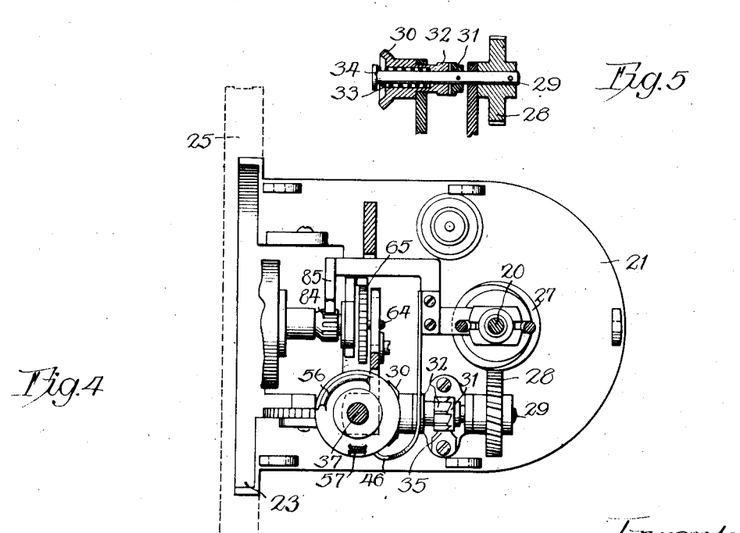
Fig. 4 is a partial plan section taken on the line 4—4 of Fig. 3.
Fig. 5 is a sectional detail view taken on the line 5—5 of Fig. 3.

I have illustrated a shaft 20 suitably supported by two supporting plates 21, 22. The forward portions of these supporting plates carry arcuate-shaped extensions 23, 24, for supporting the front plate 25. A suitable enclosing housing 26 is adapted to be secured to these supporting plates and enclose the sides and rear of the instrument. The shaft 20 may be driven in any suitable manner, and mounted thereon there is a worm 27 which meshes with a worm gear 28 mounted upon a cross shaft 29. Loosely mounted upon the opposite end of this shaft 29 there is a bevel gear 30 which is connected to this shaft through a suitable clutch, as shown in Figs. 3, 4 and 5. This clutch consists of a member 31 secured to the shaft 29 and provided on its face with ratchet clutch teeth which engage with similar co-acting teeth in one end of the sleeve member 32 which carries at its opposite end the bevel gear 30. A spring 33 surrounds the shaft 29 and engages between the member 32 and the head 34 on the shaft 29 so as to normally maintain the clutch members 31 and 32 in engagement so that as the shaft 20 is rotated in a forward direction, motion is imparted to the bevel gear 30. Reverse movement of the member 32 is prevented by means of a spring 35 which engages with one of a series of teeth around the periphery of the member 32. Therefore, when the shaft 20 is rotated in the reverse direction, the clutch teeth of the member 31 ride idly over the corresponding teeth of the member 32, the slight longitudinal movement which is necessary for this operation being permitted by means of the spring 33. In mesh with the bevel pinion 30 is a second bevel pinion 36 mounted upon a vertical shaft 37 mounted in the supporting plates 21, 22. Upon opposite ends of this vertical shaft there are the worms 38, 39, which drive suitable counting disks 40, 41, whereby the total number of revolutions may be recorded. These counting disks can be of any well known construction and form no part of my present invention except that for convenience it is often desirable to combine such counting disks with my speed regulating device so that the total distance traversed can be measured as well as having the speed indicated and controlled.

Mounted upon the shaft 20 there is a suitable governor 42 provided with a fixed sleeve 43 and a sliding sleeve 44. Carried by the sliding sleeve 44 there is a lateral extending bracket 45 to which is secured a vertically extending controlling member 46 provided with a straight front edge in the central portion of which there is a notch 47. Mounted on the shaft 37 there is a cylindrical drum 48 from whose periphery extend a pair of pins 49, 50, which are adapted to engage with the controlling member 46. This drum is mounted upon a sleeve 51 which is slidably mounted upon the shaft 37 but rotates therewith by reason of the engagement of the stud 52 in the slot 53 in the shaft 37. (See Fig. 14.) Within the drum 48 there is a spiral spring 54, one end of which is secured to the sleeve 51, while the other end frictionally engages with the inside periphery of the drum. Thus when the shaft 37 and sleeve 51 rotate, they continually wind up the spring 54, the outer end of the spring slipping around the inner periphery of the drum 48, this spring being thus maintained at all times under sufficient tension to rapidly rotate the drum 48 at any time either of the pins 49 or 50 are freed from engagement with the member 46 by reason of the slot 47 being brought opposite one of these pins.

Figure 12:
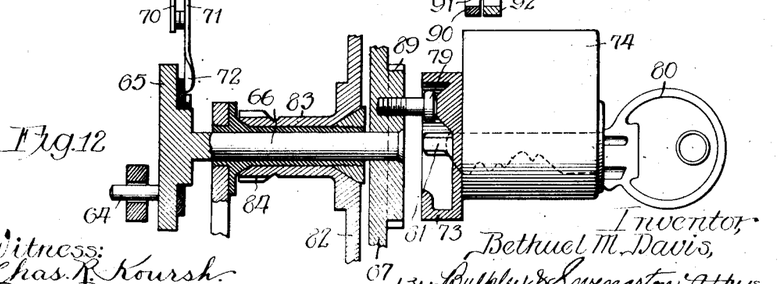
Fig. 12 is an enlarged sectional view similar to Fig. 11, but showing the parts in their relative positions after the key has been inserted and the lock operated to close the control circuit.
Figure 13:
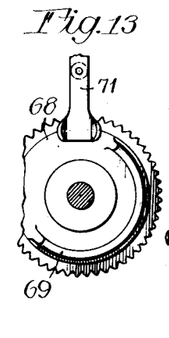
Fig. 13 is a detail sectional view taken on the line 13—13 of Fig. 11.
Figure 19:
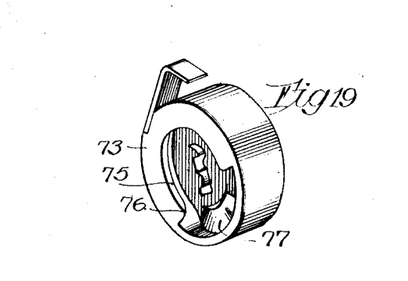
Fig. 19 is a detail perspective view of the cup-shaped lock-controlled member.

Mounted upon one face of the drum 48, there is a disk 55 of insulating material, such as fiber or rubber, which disk carries around a portion of its periphery a ridge 56 which is adapted to be forced between two spring contacts 57. When the drum is released, this insulating ridge 56 is quickly forced between the spring contacts 57, thus quickly opening the circuit so as to prevent arcing between the contacts. These spring contacts which are in a control circuit of the propelling motor such as the ignition circuit of an internal combustion engine or a power controlling circuit of an electric motor, are mounted upon the bracket 58, which bracket is supported by a pin 59 which rides in a vertical slot 60 in one arm of this bracket. This bracket 58 is also provided with angular extensions 61, 62, which engage with opposite ends of the sleeve 51 on the shaft 37 whereby when this bracket is moved vertically this sleeve 51 is caused to slide along this shaft. In order to move the bracket in this manner, it is provided with a horizontal slot 63 through which projects a pin 64 carried by a circular disk 65 mounted on one end of a shaft 66 which extends forwardly of the instrument and carries at its forward end the speed governing dial 67. The forward face of the disk 65 carries an insulating disk 68 which disk is provided with a raised ridge 69 which extends about half way around its circumference. In the control circuit are a pair of springs 70, 71, the latter of which is provided with an extending arm which engages with the insulating disk 68. Mounted on the forward end of the shaft 66 is the member 73 which is controlled by a suitable lock 74. This member 73, as clearly indicated in detail in Fig. 19, is cup-shaped and its lower face is provided with an inwardly extending flange 75 which extends about two-thirds way around the face, the edges of this flange being beveled, as indicated at 76. In the space between the ends of this flange, there is a rounded projection 77. Secured to the front face of the speed governing dial 67, there is a pin 78 provided with a head 79 which is adapted to engage beneath the flange 75. When the lock 74 is rotated by means of the key 80, the cup-shaped member 73 is likewise rotated until the head 79 of the pin 78 is disengaged from the flange 75 and this head of the pin rides up on the rounded projection 77, thus forcing the speed governing dial 67 and the shaft 66 on which it is mounted inwardly—that is, to the left as indicated in Fig. 12. When moved in this manner, the disk 65 is moved a sufficient distance to permit the springs 70, 71, to come into engagement, provided the end 72 of the spring 71 is in engagement with the flat portion of the insulating disk 68. If, however, the end 72 of the spring 71 is in engagement with the ridge 69, this movement of the disk 65 is insufficient to bring these switch springs into engagement. The key 80 is provided with an extension 81 which is located to one side of the axis of the key so that as this key is rotated in the lock this end projection 81 strikes against the head 79 of the pin 78, thereby rotating the speed regulating dial 67 and the shaft 66 upon which it is mounted. This rotation of the shaft 66 moves the bracket 58 vertically through the medium of the engagement of the pin 64 with the slot 63 thereby adjusting the vertical position of the drum 48.

Loosely mounted upon the shaft 66 there is a speed indicating dial 82 which is provided with a sleeve 83 which carries a pinion 84. This speed indicating dial is operated by means of a rack 85 carried by the end of the arm 45 and which pinion engages with the pinion 84.

Figures 14, 15:
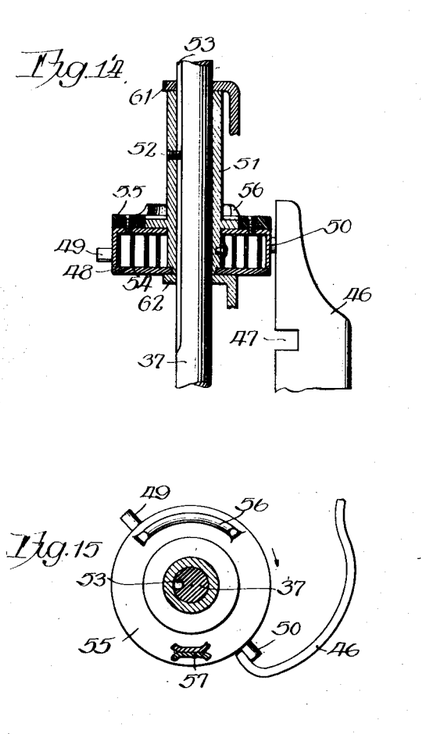
Fig. 14 is an enlarged detail sectional view showing the switch operating drum and its co-operating parts in one operating position.
Fig. 15 is a plan view of the parts shown in Fig. 14.
Figures 16, 17:
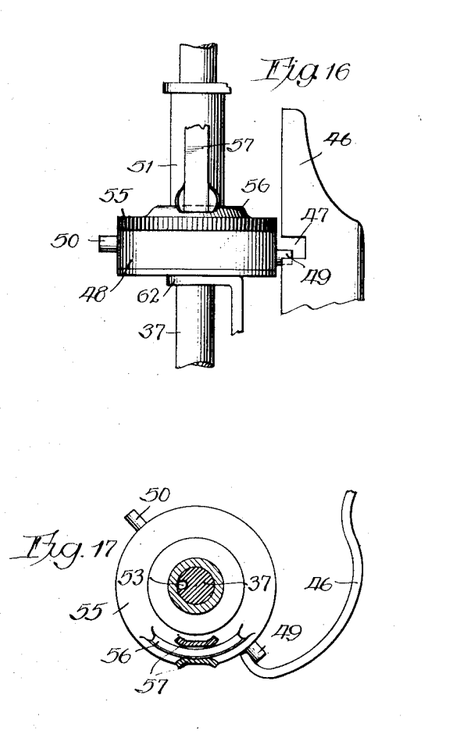
Fig. 16 is a side elevation of the switch operating drum and its co-operating parts in a second operating position.
Fig. 17 is a plan view of the parts shown in Fig. 16.
Figure 18:
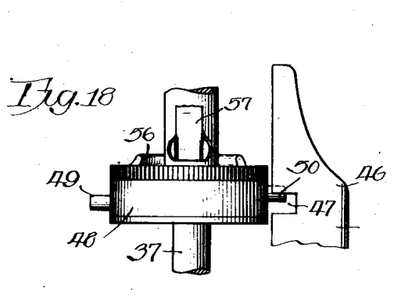
Fig. 18 is a side elevation of the switch operating drum and its co-operating parts in a third operating position.

The operation of the device is as follows:— Assuming the speed regulating dial to have been set for a predetermined speed of 20 miles per hour, for example, the key 80 is inserted in the lock and rotated so as to rotate the cup-shaped member 73 so that the head 79 of the pin 78 is disengaged from the flange 75 and brought into engagement with the projection 77. The speed regulating dial and shaft 66 are thus forced inward so as to permit the switch springs 70, 71, to come into engagement, thereby closing the control circuit. The car can then be started and as its speed increases, the movable or sliding sleeve 44 slides upwardly on the shaft 20 thus operating the speed indicating dial 82, through the rack and pinion connection, to indicate the speed at any instant, and at the same time carrying the controlling member 46 upwardly. This position of the parts is represented in Figs. 14 and 15 where it will be seen that the drum 48 is held from rotation by reason of the engagement of the pin 50 with the controlling member 46. Likewise in this position the spring contacts 57 are closed. As the speed of the vehicle increases, the notch 47 is brought opposite the pin 50 thereby releasing the drum and permitting it to make one quick half revolution until the pin 49 strikes against the member 46, as indicated in Fig. 16, thereby bringing the drum to a stop. This movement of the drum, however, has brought the raised insulating section 56 between the switch springs 57, thereby quickly forcing them open and breaking the control circuit. The motor is thus stopped and as the speed of the vehicle thereby decreases, the controlling member 46 moves downwardly so that the pin 49 comes into engagement with the slot 47, thereby again permitting the drum to make a quick half revolution under the control of the spring 54 until the pin 50 engages with the member 46, as indicated in Fig. 18. The control circuit is thereby closed and the engine again brought into operation. If it is desired to change the adjusted speed at which the control circuit is to be broken, the key 80 is rotated so that its end 81 strikes the head 79 on the pin 78 thereby rotating the shaft 66 and through the medium of the connection 64, moving the bracket 58 and the drum 48 vertically so that it is necessary to move the controlling member 46 a varying distance before the slot 47 comes into engagement with the pin 50. As the distance this member 46 moves is dependent upon the speed of the vehicle, this adjustment determines the speed at which the pin 50 will be brought into engagement with the slot 47 and thus determines the speed at which the control circuit will be broken.

When the key is withdrawn, the lock is rotated so as to carry the cup-shaped member 73 around so that the head 79 of the pin 78 engages with the beveled end of the flange 75 and thus the pin and the speed indicating dial are drawn forwardly and the switch springs 70, 71, separated. The car is in this manner locked and cannot be operated until the key has been inserted and the lock again operated in the manner previously described.

Figure 6:
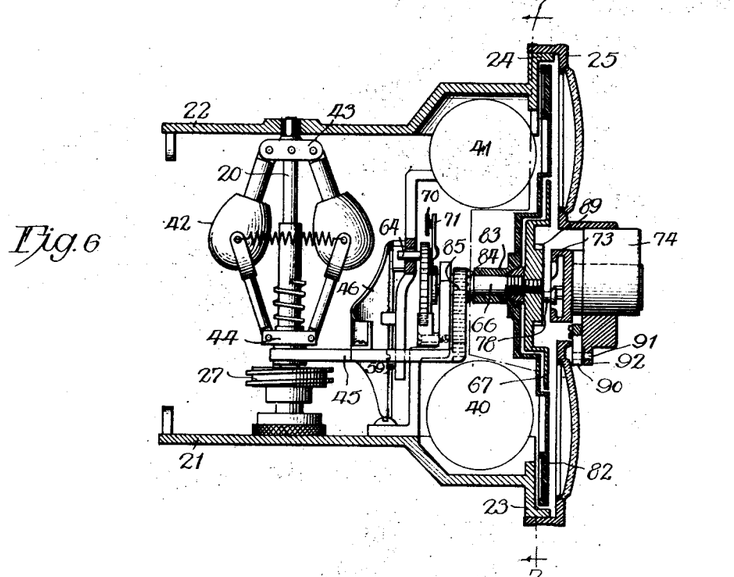
Fig. 6 is a vertical longitudinal sectional view with the enclosing casing removed.
Figure 7:
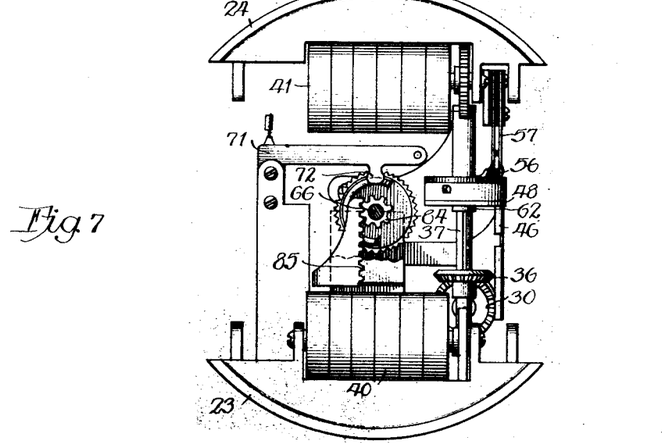
Fig. 7 is a sectional view taken on the line 7—7 of Fig. 6, looking in the directions of the arrows.
Figure 8:
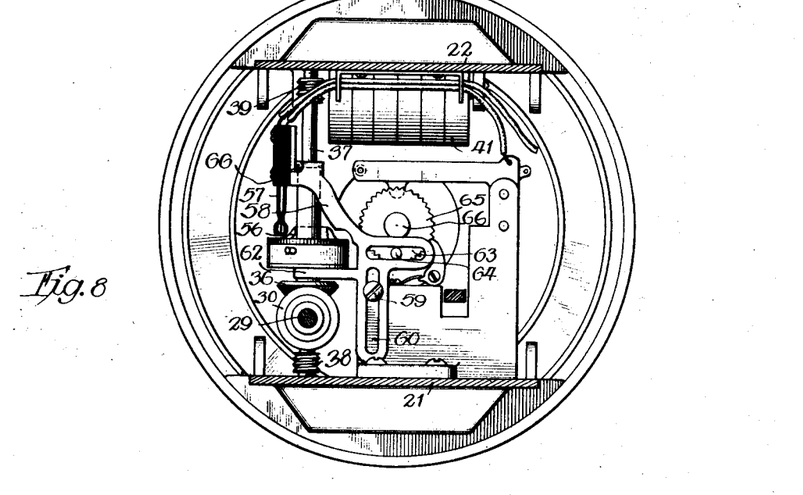
Fig. 8 is a sectional view taken on the line 8—8 of Fig. 3, looking in the direction of the arrows.
Figure 9:
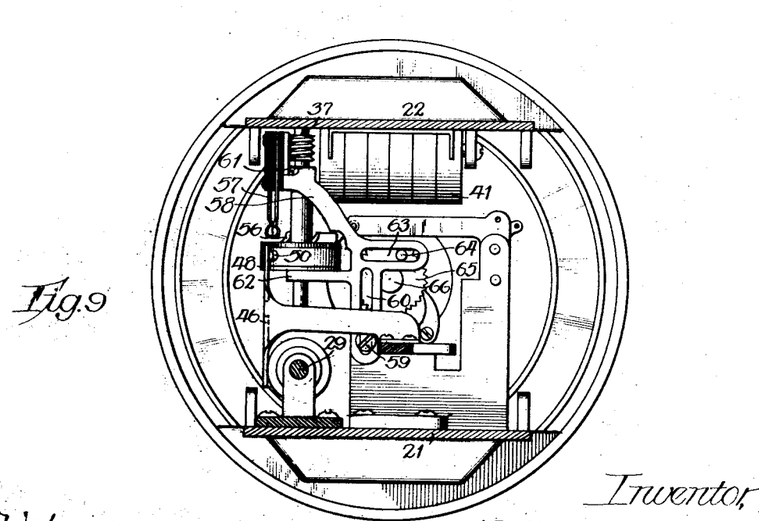
Fig. 9 is a sectional view similar to Fig. 8, but showing the parts in different adjustment.
Figure 10:
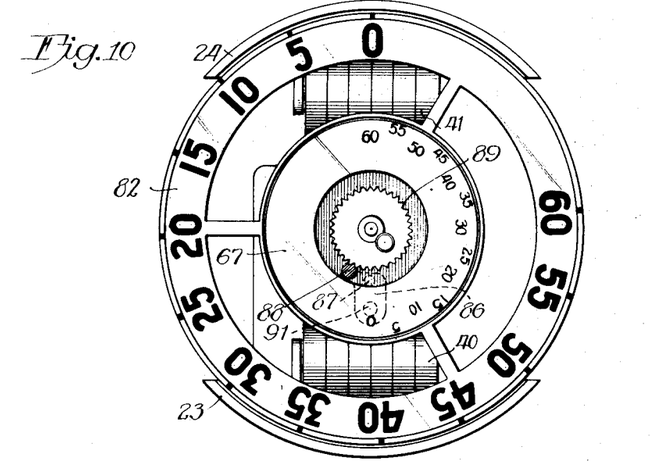
Fig. 10 is a front view with the front plate removed so as to more clearly show the indicating dials and the means for sealing the speed regulating dial in position.
Figure 11:
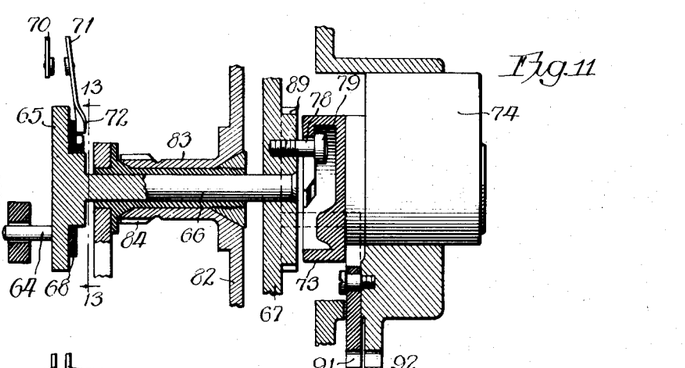
Fig. 11 is an enlarged detail section taken on a vertical central sectional line through the front half of the instrument showing the parts in their relative positions before the lock is operated to close the control circuit.

In order to prevent the set speed, at which the control circuit is broken, from being altered, I provide a seal lock which consists of a member 86 (see Fig. 10), pivotally mounted at 87 and provided with one arm having ratchet teeth 88 which engage with a ratchet 89 mounted upon the shaft 66. This member 86 is also provided with a second arm 90 provided with an opening 91 through which a sealing wire is adapted to be passed so that this arm can be sealed or locked to the lock 92 projecting downwardly from the center portion of the front plate, as shown in Fig. 6.

My invention also contemplates the employment of a second key, similar to the key 80 except that it is not provided with the projection 81. This second key, therefore, is capable only of rotating the lock and the member 73 so as to move the speed regulating dial and shaft 66 inward to close the control circuit between the springs 70, 71, but this key does not engage the pin 78 and, therefore, cannot rotate the speed regulating dial for regulating the adjustment of the parts. This second key, therefore, is capable of closing the control circuit so that the car can be operated but cannot vary the adjusted speed to which the instrument has been set. The insulating ridge 69 on the disk 68 is so located that this engages the end of the spring 71 when the speed regulating dial is set for zero speed. Thus if the possessor of the long key 80 did not desire any one else to operate the car, even though he might have one of the shorter keys, he could set the speed for zero. At this time even though the shorter key was operated to move the shaft 66 inward, it would not move it sufficiently to bring the springs 70, 71, into engagement and thus the control circuit would still be held open.

While I have illustrated and described one particular embodiment of my invention, it will be understood that I do not wish to be limited to the exact construction shown and described, nor do I wish to limit my invention for use in combination with the counting wheels or the speed-indicating dial, as in its broader aspects my invention may be employed without these features. Various other changes and modifications may be made without departing from the spirit and intent of my invention.

What I claim as my invention is:—

1. In a device of the class described, a shaft adapted to be rotated, a control circuit, a pair of contacts in said circuit, a spring-controlled escapement mechanism normally held against movement for controlling said contact springs, means controlled by the speed of said shaft for releasing said escapement, said escapement mechanism consisting of a hollow drum loosely mounted upon a shaft driven from said first-mentioned shaft, and a spiral spring within said drum, the inner end of said spring rotating with said second shaft, and the outer end of said spring frictionally engaging with the inner periphery of said drum.

2. In a device of the class described, a shaft adapted to be rotated, a control circuit, a pair of spring contacts in said circuit, a quick acting escapement mechanism for opening said contacts, a member for controlling said escapement and operating to release said escapement upon said shaft reaching a predetermined speed to thereby open said contacts, and operating to permit a second operation of said escapement to thereby close said contact springs upon the speed of said shaft falling below said predetermined speed.

3. In a device of the class described, a shaft adapted to be rotated, a control circuit, a pair of spring contacts in said circuit, an escapement mechanism for opening said contacts, an adjustable member for controlling said escapement, said adjustable member releasing said escapement upon said shaft reaching a predetermined speed to thereby open said contacts, and said adjustable member permitting a second operation of said escapement to permit said contact springs to close upon the speed of the shaft falling below said predetermined speed, said escapement mechanism consisting of a hollow drum loosely mounted upon a shaft driven from said first-mentioned shaft, and a spiral spring within said drum, the inner end of said spring rotating with said second shaft, and the outer end of said spring frictionally engaging with the inner periphery of said drum.

4. In a device of the class described, a rotating member, an electrical control circuit, a pair of normally closed contacts in said circuit, a spring-operated member, means for holding said spring-operated member against movement and for then releasing the same at a predetermined speed of said rotating member, the movement of said spring-operated member operating to open said contacts, means for adjusting said spring-operated member to cause it to be released to open the contacts at various predetermined speeds of said rotating member, and means for locking said spring-operated means against adjustment.

5. In a device of the class described, a shaft adapted to be rotated, a control circuit, a pair of contacts in said circuit, a spring-controlled escapement mechanism, means for holding said escapement against movement and for releasing the same at a predetermined speed of said shaft, the movement of said escapement operating to open said contacts, means for adjusting said co-acting parts so as to cause said escapement to be released at various predetermined speeds of said shaft, and means for preventing operation of said adjusting means.

6. In a device of the class described, a shaft adapted to be rotated, a control circuit, a pair of spring contacts in said circuit, a quick acting escapement mechanism for opening said contacts, a member for controlling said escapement and operating to release said escapement upon said shaft reaching a predetermined speed to thereby open said contacts and operating to permit a second operation of said escapement to thereby close said contact springs upon the speed of said shaft falling below said predetermined speed, and means for adjusting said co-operating parts to thereby cause said escapement to be released at various predetermined speeds of said shaft.

7. In a device of the class described, a shaft adapted to be rotated, a control circuit, a pair of spring contacts in said circuit, an escapement mechanism for opening said contacts, a member for controlling said escapement and operating to release said escapement upon said shaft reaching a predetermined speed to threby open said contacts and operating to permit a second operation of said escapement to thereby close said contact springs upon the speed of said shaft falling below said predetermined speed, means for adjusting said co-operating parts to thereby cause said escapement to be released at various predetermined speeds of said shaft, and means for preventing operation of said adjusting means.

8. In a device of the class described, a shaft adapted to be rotated, a control circuit, a pair of spring contacts in said circuit, an escapement mechanism for opening said contacts, a member for controlling said escapement and operating to release said escapement upon said shaft reaching a predetermined speed to thereby open said contacts and operating to permit a second operation of said escapement to thereby close said contact springs upon the speed of said shaft falling below said predetermined speed, and lock-controlled means for adjusting said co-operating parts to thereby cause said escapement to be released at various predetermined speeds of said shaft.

9. In a device of the class described, a shaft adapted to be rotated, a control circuit, a pair of normally open contacts in said circuit, lock-controlled means for closing said contacts, a pair of normally closed contacts in said circuit, a spring-controlled escapement mechanism for opening said normally closed contacts upon said shaft attaining a predetermined speed, and means controlled by said escapement for permitting said second pair of contacts to again close upon the speed of said shaft falling below said predetermined speed.

10. In a device of the class described, a shaft adapted to be rotated, a control circuit, a pair of normally open contacts in said circuit, lock-controlled means for closing said contacts, a pair of normally closed contacts in said circuit, a spring-controlled escapement mechanism for opening said normally closed contacts upon said shaft attaining a predetermined speed, and means for adjusting said escapement to thereby cause the same to open said normally closed contacts at various predetermined speeds of said shaft.

11. In a device of the class described, a shaft adapted to be rotated, a control circuit, a pair of normally open contacts in said circuit, lock-controlled means for closing said contacts, a pair of normally closed contacts in said circuit, a spring-controlled escapement mechanism for opening said normally closed contacts upon said shaft attaining a predetermined speed, means controlled by said escapement for permitting said second pair of springs to again close upon the speed of said shaft falling below said predetermined speed, and means for adjusting said escapement to thereby cause the same to open said normally closed contacts at various predetermined speeds of said shaft.

12. In a device of the class described, a shaft adapted to be rotated, a control circuit, a pair of normally open contacts in said circuit, means controlled by a lock for closing said contacts, a pair of normally closed contacts in said circuit, a spring-controlled escapement mechanism for opening said normally closed contacts when said shaft reaches a predetermined speed, means for adjusting said escapement to thereby cause the same to open said normally closed contacts at various predetermined speeds of said shaft, said lock adapted when operated to prevent adjustment of said escapement.

13. In a device of the class described, a shaft adapted to be rotated, a control circuit, a pair of normally open contacts in said circuit, means controlled by a lock for closing said contacts, a pair of normally closed contacts in said circuit, a spring-controlled escapement mechanism for opening said normally closed contacts when said shaft reaches a predetermined speed, means controlled by said escapement for permitting said second pair of springs to again close upon the speed of said shaft falling below said predetermined speed, means for adjusting said escapement to thereby cause the same to open said normally closed contacts at various predetermined speeds of said shaft, said lock adapted when operated to prevent adjustment of said escapement.

14. In a device of the class described, a shaft adapted to be rotated, a control circuit, a pair of normally closed contacts and a pair of normally open contacts in said circuit, a lock controlled by a key adapted when operated to permit said normally open contacts to come into engagement, a spring-controlled escapement mechanism, and means controlled by the speed of said shaft for operating said escapement at a predetermined speed of said shaft to cause said normally closed springs to be opened, and means controlled by said key for adjusting said escapement to thereby cause said normally closed springs to be opened at various predetermined speeds of said shaft.

15. In a device of the class described, a shaft adapted to be rotated, a control circuit, a pair of normally closed contacts and a pair of normally open contacts in said circuit, a lock controlled by a key adapted when operated to permit said normally open contacts to come into engagement, a spring-controlled escapement mechanism, and means controlled by the speed of said shaft for operating said escapement at a predetermined speed of said shaft to cause said normally closed springs to be opened, said escapement again operating to close said springs upon the speed of the shaft falling below said predetermined speed, and means controlled by said key for adjusting said escapement to thereby cause said normally closed springs to be opened at various predetermined speeds of said shaft.

16. In a device of the class described, a shaft adapted to be rotated, a governor including a sleeve sliding upon said shaft, an arm connected to said sleeve, a second shaft, a rack carried by said arm engaging with a pinion mounted upon said second shaft, an indicating dial upon the opposite end of said shaft for indicating the speed of said first-mentioned shaft, a control circuit, a pair of normally closed contacts in said circuit, an escapement mechanism, a member carried by said arm engaging with said escapement and holding same against movement and adapted to release the same upon said first-mentioned shaft attaining a predetermined speed, and means controlled by the release of said escapement for opening said contacts to thereby break said control circuit.

17. In a device of the class described, a shaft adapted to be rotated, a governor including a sleeve sliding upon said shaft, an arm connected to said sleeve, a second shaft, a rack carried by said arm engaging with a pinion mounted upon said second shaft, an indicating dial upon the opposite end of said shaft for indicating the speed of said first-mentioned shaft, a control circuit, a pair of normally closed contacts in said circuit, an escapement mechanism, a member carried by said arm engaging with said escapement and holding same against movement, said member adapted to release said escapement upon said first-mentioned shaft attaining a predetermined speed, means controlled by the release of said escapement for opening said contacts to thereby break said control circuit, and lock-controlled means for adjusting the position of said escapement to thereby cause said normally closed springs to be opened at various predetermined speeds of said first-mentioned shaft.

18. In a device of the class described, a shaft adapted to be rotated, a governor including a sleeve sliding upon said shaft, a second shaft, a hollow drum loosely mounted upon said second shaft, a spring within said drum having its inner end connected to said second shaft and its outer end frictionally engaging with the interior periphery of said drum, a pin projecting radially from the outside surface of said drum, a member connected to said sliding sleeve for engaging with said pin to thereby hold said drum against movement, a notch in said member adapted to engage with said pin upon said first-mentioned shaft attaining a predetermined speed to thereby permit said drum to be released and quickly rotated by said spring, a control circuit, a pair of contacts in said circuit, and means controlled by the rotation of said drum for opening said contacts to thereby break said control circuit.

19. In a device of the class described, a shaft adapted to be rotated, a governor including a sleeve sliding upon said shaft, a second shaft, a hollow drum loosely mounted upon said second shaft, a spring within said drum having its inner end connected to said second shaft and its outer end frictionally engaging with the interior periphery of said drum, a pin projecting radially from the outside surface of said drum, a member connected to said sliding sleeve for engaging with said pin to thereby hold said drum against movement, a notch in said member adapted to engage with said pin upon said first-mentioned shaft attaining a predetermined speed to thereby permit said drum to be released and quickly rotated by said spring, a control circuit, a pair of springs in said circuit, means controlled by the rotation of said drum for opening said contact springs to thereby break said control circuit, and means for adjusting the position of said drum to thereby cause said drum to be released at various predetermined speeds of said first-mentioned shaft.

20. In a device of the class described, a shaft adapted to be rotated, a governor including a sleeve sliding upon said shaft, a second shaft, a hollow drum loosely mounted upon said second shaft, a spring within said drum having its inner end connected to said second shaft and its outer end frictionally engaging with the interior periphery of said drum, a pair of pins projecting radially from said drum at substantially diametrically opposite points, a member carried by said arm for engaging with one of said pins to thereby hold said drum against movement, a slot in said member adapted to be brought adjacent to said pin upon said first-mentioned shaft attaining a predetermined speed to thereby release said drum and permit same to make a half revolution until said second pin is brought into engagement with said member, whereby said drum is again held against movement until said first shaft falls below said predetermined speed when said slot engages with said second pin to thereby permit said drum to make a second half revolution, a control circuit, and means controlled by the movement of said drum for opening and closing said circuit.

21. In a device of the class described, a shaft adapted to be rotated, a governor including a sleeve sliding upon said shaft, a second shaft, a hollow drum loosely mounted upon said second shaft, a spring within said drum having its inner end connected to said second shaft and its outer end frictionally engaging with the interior periphery of said drum, a pair of pins projecting radially from said drum at substantially diametrically opposite points, a member carried by said arm for engaging with one of said pins to thereby hold said drum against movement, a slot in said member adapted to be brought adjacent to said pin upon said first-mentioned shaft attaining a predetermined speed to thereby release said drum and permit same to make a half revolution until said second pin is brought into engagement with said member, whereby said drum is again held against movement until said first shaft falls below said predetermined speed when said slot engages with said second pin to thereby permit said drum to make a second half revolution, a control circuit, means controlled by the movement of said drum for opening and closing said circuit, and means for adjusting the position of said drum to thereby vary the speed at which said drum is released.

22. In a device of the class described, a shaft adapted to be rotated, a control circuit, a pair of contacts in said circuit, escapement mechanism for controlling said contacts, means for controlling said mechanism and operating upon said shaft reaching a predetermined speed to cause said mechanism to open said contacts and operating to permit a second operation of said mechanism to thereby close said contacts upon the speed of said shaft falling below said predetermined speed.

Signed by me at Chicago, Illinois, this 3 day of Sept., 1920.

BETHUEL M. DAVIS.